United States Patent [19]

Manzel

[11] 4,293,151
[45] Oct. 6, 1981

[54] CONNECTORS FOR ELECTRICAL CABLES

[76] Inventor: Ernest V. Manzel, 2235 76th Ct., Elmwood Park, Ill. 60635

[21] Appl. No.: 835,482

[22] Filed: Sep. 22, 1977

[51] Int. Cl.³ .............................................. F16L 3/04
[52] U.S. Cl. ................................ 285/161; 174/65 R; 285/162; 285/205
[58] Field of Search ............... 285/161, 162, 128, 196, 285/195, 192, 194, 200, 308, 311, DIG. 22, 215, 216, 217, 218, 208, 205; 16/2; 174/65 R, 65 G, 153 G

[56] References Cited

U.S. PATENT DOCUMENTS

| | | | |
|---|---|---|---|
| 1,106,761 | 8/1914 | Weikert et al. | 285/162 |
| 2,128,040 | 8/1938 | Conners | 285/162 |
| 2,514,504 | 7/1950 | Moline | 285/216 X |
| 2,559,759 | 7/1951 | DeSwart | 16/2 |
| 3,405,958 | 10/1968 | Holdren | 285/192 X |

FOREIGN PATENT DOCUMENTS 2264230 10/1975 France ................. 285/161

*Primary Examiner*—Dave W. Arola
*Attorney, Agent, or Firm*—Burmeister, York, Palmatier, Hamby & Jones

[57] ABSTRACT

The connector comprises a tubular generally cylindrical connector body having means for retaining an armored BX electrical cable, or any other desired cable, therein. An internally threaded nut is mounted on an externally threaded front portion of the body. The rear portion of the body is provided with a plurality of resiliently yieldable latching arms which slant outwardly and forwardly therefrom. The latching arms yield inwardly when the connector body is pushed rearwardly through an opening in a supporting wall, whereupon the latching arms spring outwardly behind the supporting wall. The nut can then be tightened so that the wall will be clamped between the nut and the latching arms. In this way, the connector can be mounted on a supporting wall which is inaccessible from the rear side. The electrical cable may be retained within the connector body by a clamping screw which is recessed within the periphery of the body, so that the screw does not interfere with the insertion of the connector body through the opening in the supporting wall. As an optional feature, a wedging ring may be slidably mounted around the connector body, between the nut and the latching arms, so that the ring will cause the latching arms to be spread outwardly when the nut is tightened.

6 Claims, 7 Drawing Figures

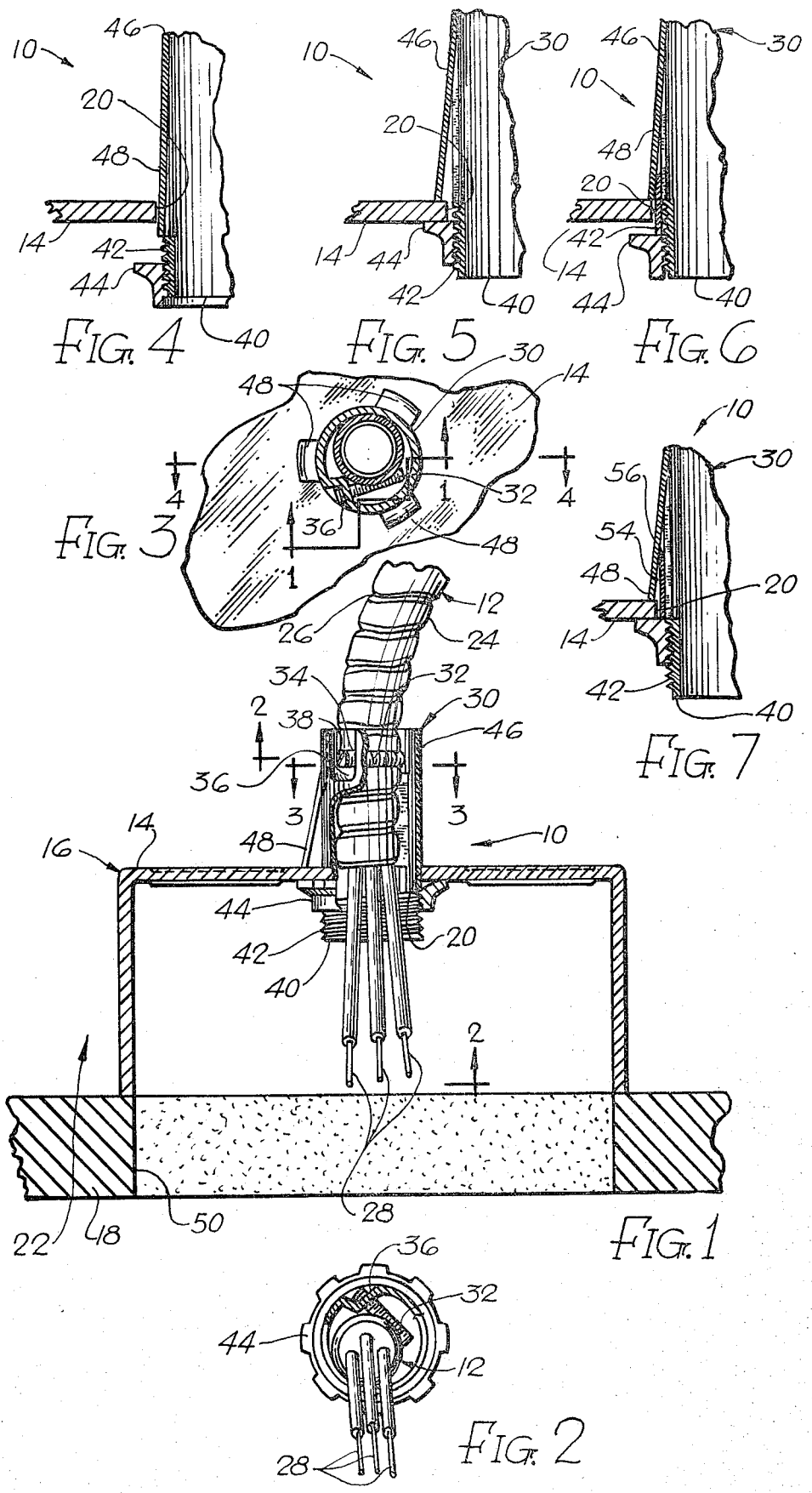

CONNECTORS FOR ELECTRICAL CABLES

This invention relates to a connector for mounting one end of an electrical cable in an opening in a supporting wall, such as one wall of an outlet box. The connector of the present invention is particularly advantageous for use on armored BX electrical cables, but is also applicable to other types of electrical cables.

One principal object of the present invention is to provide a connector for easily and quickly connecting an electrical cable to an existing outlet box which is completely inaccessible from the rear side.

When older buildings are being remodeled, it is often desirable to provide additional electrical circuits by installing additional electrical cables in the hollow wall spaces of the building. Armored BX electrical cables are often used for such additional circuits. It is often desirable to connect the end of an electrical cable to an existing outlet box, the rear side of which is inaccessible, because the box is mounted behind an existing wall or ceiling.

A further object is to provide a new and improved connector which can be secured tightly to one end of an armored BX electrical cable, inserted rearwardly through an opening in an existing outlet box, and clamped tightly to the wall of the outlet box, so that the armor of the cable will be securely grounded to the outlet box, without any need for access to the rear side of the outlet box. In this way, the BX cable can be fished through a wall space and secured to existing outlet boxes, without any need for producing additional openings in the walls or ceilings of the building.

In accordance with the present invention, these and other objects are achieved by providing a tubular generally cylindrical connector body having means for retaining an electrical cable therein. The body has an externally threaded front portion for receiving an internally clamping nut. The rear portion of the connector body is provided with a plurality of resiliently yieldable latching arms which slant outwardly and forwardly. The resilient yieldability of the latching arms makes it possible to push the connector body rearwardly through an opening in a supporting wall, such as the wall of an outlet box, whereupon the latching arms will spring outwardly behind the wall. The nut can then be tightened to bring the nut and the latching arms into clamping engagement with the front and rear sides of the supporting wall. Preferably, the latching arms are thin, flexible and resilient and are struck outwardly from the material of the connector body.

The electrical cable may be retained within the connector body by a clamping screw which is recessed within the periphery of the connector body, so that the screw will not interfere with the insertion of the connector body through the opening in the supporting wall.

As an optional feature, a wedging ring may be slidably mounted around the connector body, between the nut and the latching arms, so that the ring will spread the latching arms outwardly when the nut is tightened into clamping engagement with the supporting wall.

Further objects, advantages and features of the present invention will appear from the following description, taken with the accompanying drawings, in which:

FIG. 1 is a side view of a connector to be described as an illustrative embodiment of the present invention, the view being partly in longitudinal section along the broken line 1—1 in FIG. 3.

FIG. 2 is a front end view of the connector, partly in section along the broken line 2—2 in FIG. 1.

FIG. 3 is a sectional view taken from the rear, generally along the line 3—3 in FIG. 1.

FIG. 4 is a fragmentary longitudinal section, taken generally along the line 4—4, and showing the connector as it is being pushed through the opening in the wall of the outlet box.

FIG. 5 is a fragmentary section similar to FIG. 4, but showing the connector fully installed, with the supporting wall clamped between the nut and the latching arms.

FIG. 6 is a fragmentary longitudinal section, similar to FIG. 4, but showing a modified embodiment which utilizes a wedging ring for spreading the latching arms, the connector being shown before the clamping nut has been tightened.

FIG. 7 is a view similar to FIG. 6, but showing the connector after the clamping nut has been tightened to spread the latching arms and to clamp the supporting wall between the nut and the latching arms.

As just indicated, FIGS. 1–5 illustrate a connector 10 for connecting one end of an electrical cable 12 to a supporting wall 14, illustrated as being the rear wall of a metal outlet box 16. FIG. 1 illustrates a typical situation, in which the outlet box 16 is an existing box, mounted behind a building wall 18, which may be either a room wall or a ceiling, or possibly even a floor. The connector 10 is mounted in an opening 20 formed in the supporting wall 14.

The outlet box 16 is mounted in a hollow wall space 22 behind the wall 18. The wall space 22 is basically inaccessible, except through the opening 20, and other similar openings in this and other outlet boxes. By the use of a fish tape, or by other similar methods, the electrical cable 12 can be fished through the wall space 22 and threaded through the opening 20. However, the connector 10 cannot be inserted through the opening 20 from the rear of the wall 14, because the rear of the wall is inaccessible.

The illustrated electrical cable 12 is of the BX type, having a flexible metal armor 24, in the form of a helically wound metal coil, the successive turns of which interlock to form a helical groove 26. Two or three insulated wires 28 usually extend within the armor 24.

The illustrated connector 10 comprises a tubular, generally cylindrical connector body 30, within which the electrical cable 12 is clamped or otherwise retained. In this case, the cable 12 is retained by a clamping screw 32 which engages the metal armor 24 and preferably interlocks with the helical groove 26. The clamping screw 32 is recessed within the periphery of the connector 30, so that the clamping screw will not interfere with the insertion of the body 30 through the opening 20. It will be seen that the outside diameter of the connector body 30 is made slightly less than the inside diameter of the opening 20, so that the body 30 can easily be slipped through the opening 20. In this case, the clamping screw 32 is threaded through an internally threaded opening 34 in an inwardly formed wall portion 36 of the connector body 30. The inwardly recessed wall portion 36 is bent inwardly on the connector body 30, near its rear end, and extends inwardly at a slant angle so that the clamping screw 32 extends at a slant angle relative to the nearest diametrical line. The illustrated clamping screw 32 is formed without a head, but with a screw driver slot 38 in the outer end of the screw 32, to provide for the tightening and loosening of the screw. It will be understood that other suitable means may be employed to retain the electrical cable 12 within the connector body 30.

The connector body 30 has a front portion 40 with external threads 42 thereon, for receiving an internally threaded clamping nut 44.

The connector body 30 has a rear portion 46 with a plurality of resiliently yieldable latching arms 48 thereon, slanting outwardly and forwardly from the rear portion 46. There are three latching arms 48 in the illustrated construction, the arms 48 being equally spaced around the periphery of the connector body 30. Preferably, the arms 48 are struck outwardly from the material of the connector body 30. However, the latching arms 48 can be formed in some other manner, if desired. The latching arms 48 are yieldable inwardly, so that the connector body 30 can be pushed in a rearward direction through the opening 20 in the supporting wall 14. The latching arms 48 then spring outwardly, so that the supporting wall 14 can be clamped between the latching arms 48 and the nut 44, by tightening the nut 44.

In describing the use of the connector 10, it will be assumed that the outlet box 16 is an existing box, secured behind the building wall 18, so that the rear side of the box is inaccessible. By the use of a fish tape, or some other procedure, the electrical cable 12 is fished through the wall space 22. One end of the electrical cable 12 is threaded out of the wall space 22 through the opening 20 in the rear wall 14 of the outlet box 16. The end of the electrical cable 12 is pulled forwardly, out of the front of the outlet box 16, through the opening 50 in the wall 18 in front of the box 16. The connector 10 is then mounted on the end of the cable 12, by slipping the end of the cable through the tubular connector body 30 and tightening the clamping screw 32 against the metal armor 24. Preferably, the screw 32 is caused to interlock with the helical groove 26 in the armor 24. The screw 32 is tightened until its outer end is recessed within the periphery of the connector body 30.

As shown in FIG. 4, the nut 44 is screwed loosely around the front portion 40 of the connector body 30. The connector body is then pushed rearwardly through the opening 20 in the supporting wall 14. Due to the flexibility and resilience of the latching arms 48, the arms yield inwardly so that the arms can be pushed through the opening 20. After passing through the opening 20, the latching arms 48 spring outwardly, as shown in FIGS. 1 and 5. The connector body 30 is thus latched in the opening 20 against forward movement. The nut 44 is then tightened, so as to clamp the wall 14 between the nut and the latching arms 48. The connector 10 and the electrical cable 12 are thus securely fastened to the supporting wall 14. The connector body 30, as well as the nut and the latching arms 48, are preferably made of metal, so that the armor 24 of the electrical cable 12 is effectively grounded to the metal outlet box 16.

FIGS. 6 and 7 show a slightly modified construction, in which an optional wedging ring 54 is slipped around the outside of the connector body 30 and is interposed between the nut 44 and the inner surfaces of the latching arms 48. The wedge ring 54 is generally cylindrical in shape and is slidably fitted around the outside of the connector body 30. When the nut 44 is tightened, it forces the wedging ring 54 along the connector body 30 and against the inner surfaces of the latching arms 48, so that the latching arms are caused to spread outwardly, so that there will be no possibility of pulling one or more of the latching arms 48 forwardly through the opening 20, when the nut 44 is tightened. The wedge ring 54 may have a tapered annular wedge surface 56 around its rear end portion.

I claim:

1. A connector for an electrical cable having an electrically conductive sheath, said connector comprising a tubular electrically conductive generally cylindrical connector body, said connector body having a rear end portion with clamping means thereon for clamping the sheath of the electrical cable within said connector body to afford solid electrical contact between said connector body and the sheath, said connector body having a threaded front end portion with external screw threads thereon, and an internally threaded nut in screw threaded engagement with said front end portion, said connector body having an intermediate portion with a plurality of conductive latching arms slanting outwardly and forwardly therefrom, said intermediate portion of said connector body being between said front end portion and said rear end portion which are at opposite ends of said connector body, said conductive latching arms having front ends, said latching arms being resiliently yieldable to pass through an opening in a conductive mounting wall and to snap outwardly behind such wall, said nut being operable to bring said nut and the front ends of said latching arms into clamping arrangement with the opposite sides of such wall to afford solid electrical contact between said arms and the wall, the front end portion of the cable being insertable into said rear end portion of said connector body with the cable threaded forwardly through the opening in the mounting wall, said clamping means being operable from the front side of the mounting wall for clamping the sheath of the electrical cable within said connector body, said rear end portion and said intermediate portion of said connector body and the cable clamped therein being movable rearwardly through the opening in the mounting wall to cause the latching arms to pass rearwardly through the opening and to snap outwardly behind the wall, said rear end portion of said connector body and said clamping means being of a cross-sectional size smaller than the cross-sectional size of said intermediate portion with said latching arms whereby said rear end portion and said clamping means are adapted to fit through the opening in the mounting wall, said nut being operable from the front side of the mounting wall to tighten the nut and the front ends of said latching arms into clamping engagement with the front and rear sides of such wall to afford solid electrical contact between said arms and the wall, whereby access to the front of the mounting wall is all that is needed for clamping the connector body to the conductive sheath and for solid clamping of the mounting wall between said latching arms and said nut, there being no need for access to the rear of the mounting wall.

2. A connector according to claim 1, in which said clamping means include a clamping screw, and recessed means on said rear end portion of said connector body for threadedly receiving said clamping screw in a recessed relation to the periphery of said connector body.

3. A connector for an electrical cable having an electrically conductive sheath, said connector comprising a tubular electrically conductive generally cylindrical connector body, said connector body having a rear end portion with clamping means thereon for clamping the sheath of the electrical cable within said connector body to afford solid electrical contact between said connector body and the sheath, said connector body having a threaded front end portion with external screw threads thereon, and an internally threaded nut in screw threaded engagement with said front end portion, said connector body having an intermediate portion with a plurality of conductive latching arms slanting outwardly and forwardly therefrom, said intermediate portion of said connector body being between said front end portion and said rear end portion which are at opposite ends of said connector body, said conductive latching arms having front ends, said latching arms being resiliently yieldable to pass through an opening in a conductive mounting wall and to snap outwardly behind such wall, said nut being operable to bring said nut and the front end of said latching arms into clamping engagement with the opposite sides of such wall to afford solid electrical contact between said arms and the wall, the front end portion of the cable being insertable into said rear end portion of said connector body with the cable threaded forwardly through the opening in the mounting wall, said clamping means including a clamping screw for engaging the sheath of the electrical cable, and recessed means on said rear end portion of said connector body for threadedly receiving said clamping screw in a recessed relation to the periphery of said connector body so that said clamping screw will not interfere with the insertion of said connector body into the opening in the supporting wall, said clamping screw being operable from the front side of the mounting wall for clamping the sheath of the electrical cable within said connector body, said rear portion and said intermediate portion of said connector body and the cable clamped therein being movable rearwardly through the opening in the mounting wall to cause the latching arms to pass rearwardly through the opening and to snap outwardly behind the wall, said rear end portion of said connector body and said clamping means being of a cross-sectional size smaller than the cross-sectional size of said intermediate portion with said latching arms whereby said rear end portion and said clamping means are adapted to fit through the opening in the mounting wall, said nut being operable from the front side of the mounting wall to tighten the nut and the front ends of said latching arms into clamping engagement with the front and rear sides of such wall to afford solid electrical contact between said arms and the wall, whereby access to the front of the mounting wall is all that is needed for clamping the connector body to the conductive sheath and for solid clamping of the mounting wall between said latching arms and said nut, there being no need for access to the rear of the mounting wall.

4. A connector for an electrical cable having an electrically conductive sheath, said connector comprising a tubular electrically conductive generally cylindrical connector body, clamping means for clamping the sheath of the electrical cable within said connector body to afford solid electrical contact between said connector body and the sheath, said connector body having a threaded front portion with external screw threads thereon, and an internally threaded nut in screw threaded engagement with said front portion, said connector body having a rear portion with a plurality of conductive latching arms slanting outwardly and forwardly therefrom, said conductive latching arms having front ends, said latching arms being resiliently yieldable to pass through an opening in a conductive mounting wall and to snap outwardly behind such wall, said nut being operable to bring said nut and the front ends of said latching arms into clamping engagement with the opposite sides of such wall to afford solid electrical contact between said arms and the wall, said clamping means including a clamping screw for engaging the sheath of the electrical cable, said rear portion of said connector body having a recessed wall portion with a threaded opening therein for receiving said clamping screw in recessed relation to the periphery of said connector body so that said clamping screw will not interfere with the insertion of said connector body into the opening in the supporting wall.

5. A connector for an electrical cable having an electrically conductive sheath, said connector comprising a tubular electrically conductive generally cylindrical connector body, clamping means for clamping the sheath of the electrical cable within said connector body to afford solid electrical contact between said connector body and the sheath, said connector body having a threaded front portion with external screw threads thereon, an internally threaded nut in screw threaded engagement with said front portion, said connector body having a rear portion with a plurality of conductive latching arms slanting outwardly and forwardly therefrom, said conductive latching arms having front ends, said latching arms being resiliently yieldable to pass through an opening in a conductive mounting wall and to snap outwardly behind such wall, said nut being operable to bring said nut and the front ends of said latching arms into clamping engagement with the opposite sides of such wall to afford solid electrical contact between said arms and the wall, and a spreader ring means received around said connector body and interposed between said nut and the inner sides of said latching arms for spreading said latching arms when said nut is tightened into clamping engagement with the supporting wall.

6. A connector for an electrical cable having an electrically conductive sheath, said connector comprising a tubular electrically conductive generally cylindrical connector body, clamping means for clamping the sheath of the electrical cable within said connector body to afford solid electrical contact between said connector body and the sheath, said connector body having a threaded front portion with external screw threads thereon, an internally threaded nut in screw threaded engagement with said front portion, said connector body having a rear portion with a plurality of conductive latching arms slanting outwardly and forwardly therefrom, said conductive latching arms having front ends, said latching arms being resiliently yieldable to pass through an opening in a conductive mounting wall and to snap outwardly behind such wall, said nut being operable to bring said nut and the front ends of said latching arms into clamping engagement with the opposite sides of such wall to afford solid electrical contact between said arms and the wall, and a generally cylindrical wedge ring means slidably fitted around said connector body and interposed between said nut and said latching arms for engaging the inner sides of said arms and spreading said arms outwardly from said connector body when said nut is tightened into clamping engagement with the supporting wall.

* * * * *